(12) United States Patent
Kang et al.

(10) Patent No.: US 12,549,616 B2
(45) Date of Patent: Feb. 10, 2026

(54) FREEZE DETECTION IN VIDEO COMMUNICATION SESSIONS

(71) Applicant: AT&T Intellectual Property I, L.P., Atlanta, GA (US)

(72) Inventors: Hao Kang, Plano, TX (US); Junping Zhang, Freehold, NJ (US); Yuan Ding, Plainsboro, NJ (US); Tzvi Chumash, Matawan, NJ (US); Pranith Dachepally, Aubrey, TX (US); Matthew Foust, Albuquerque, NM (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 27 days.

(21) Appl. No.: 18/614,074

(22) Filed: Mar. 22, 2024

(65) Prior Publication Data

US 2025/0301031 A1    Sep. 25, 2025

(51) Int. Cl.
*H04L 65/752* (2022.01)
*H04L 43/0894* (2022.01)
*H04L 65/403* (2022.01)
*H04L 65/80* (2022.01)

(52) U.S. Cl.
CPC ........ *H04L 65/752* (2022.05); *H04L 43/0894* (2013.01); *H04L 65/403* (2013.01); *H04L 65/80* (2013.01)

(58) Field of Classification Search
CPC ..... H04L 65/403; H04L 65/752; H04L 65/80; H04L 43/0894
USPC ......................................... 709/204
See application file for complete search history.

(56) References Cited

U.S. PATENT DOCUMENTS

| 2020/0029240 A1* | 1/2020 | Li | H04W 24/02 |
| 2023/0247078 A1* | 8/2023 | Asadipour | H04L 65/80 |
| | | | 348/14.08 |

FOREIGN PATENT DOCUMENTS

| EP | 4135405 A1 * | 2/2023 | H04L 47/24 |
| EP | 4447532 A1 * | 10/2024 | H04L 43/091 |

* cited by examiner

*Primary Examiner* — Glenford J Madamba

(57) ABSTRACT

A processing system may obtain network performance data sets associated with a video communication session from a customer premises equipment, the network performance data sets including data sets for measurements of video uplink and downlink data rates. The processing system may apply at least one of the network performance data sets to at least one rule set implemented by the processing system to obtain a decision output indicative of whether an occurrence of: an uplink or downlink video freeze is detected. The processing system may detect the at least one of the uplink video freeze or the downlink video freeze in accordance with the decision output. The processing system may then perform at least one remedial action in response to the detecting of at least one of: the uplink video freeze or the downlink video freeze.

20 Claims, 4 Drawing Sheets

FREEZE DETECTION IN VIDEO COMMUNICATION SESSIONS

The present disclosure relates generally to communication network operations and video communication sessions, and more particularly to methods, computer-readable media, and apparatuses for performing at least one remedial action in a communication network in response to detecting at least one of: an uplink video freeze or a downlink video freeze in accordance with a decision output of at least one rule set based upon measurements of at least one of: uplink or downlink data rates at a customer premises equipment.

BACKGROUND

Online conferencing applications offer data streams of text-based messages, voice, video chat, screen sharing, and even live captions to be shared simultaneously, across geographically dispersed locations. Online conferences are used for meetings, training events, lectures, or presentations from a network-connected endpoint devices to other network-connected endpoint devices. In general, online conferencing is made possible by Internet technologies, particularly Transmission Control Protocol (TCP)/Internet Protocol (IP) connections. Online conferencing applications may enable real-time point-to-point communications as well as multicast communications from one sender to many recipients. However, aspects of different users' network connections may have significant impacts on the users' respective experiences during an online conference.

SUMMARY

In one example, the present disclosure describes a method, computer-readable medium, and apparatus for performing at least one remedial action in response to detecting at least one of: an uplink video freeze or a downlink video freeze in accordance with a decision output of at least one rule set based upon measurements of at least one of: uplink or downlink data rates at a customer premises equipment. For example, a processing system including at least one processor may obtain network performance data sets associated with a video communication session from a customer premises equipment, the network performance data sets including at least: a data set for measurements of a video uplink data rate and a data set for measurements of a video downlink data rate. The processing system may next apply at least one of the network performance data sets to at least one rule set that is implemented by the processing system to obtain a decision output indicative of whether an occurrence of at least one of: an uplink video freeze or a downlink video freeze is detected. The at least one rule set may be configured to generate the decision output based on the at least one of the network performance data sets. Accordingly, the processing system may detect the at least one of: the uplink video freeze or the downlink video freeze in accordance with the decision output. The processing system may then perform at least one remedial action in response to the detecting of the at least one of: the uplink video freeze or the downlink video freeze.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
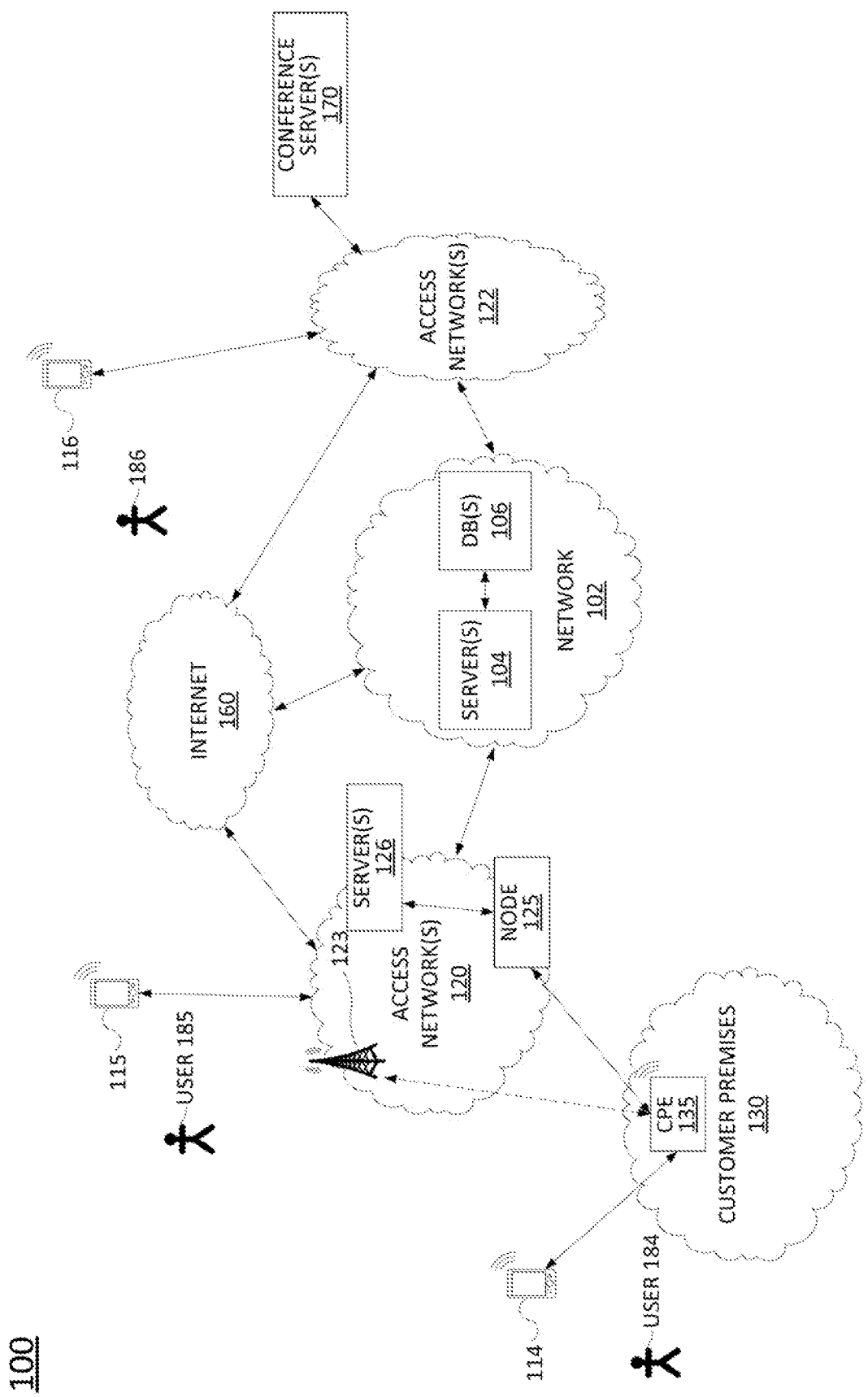
FIG. 1 illustrates an example system related to the present disclosure.

Examples of the present disclosure describe methods, computer-readable media, and apparatuses for performing at least one remedial action in a communication network in response to detecting at least one of: an uplink video freeze or a downlink video freeze in accordance with a decision output of at least one rule set based upon measurements of at least one of: uplink or downlink data rates at a customer premises equipment. In particular, aspects of different users' network connections may have significant impacts on the users' respective experiences during online conferences or other video communication sessions. Video communication applications, including online conferencing applications, may apply adaptive bitrate (ABR) technology to address quality issues that may arise due to network conditions, user endpoint device conditions, local area network (LAN) issues, including wireless signal strength, congestion, etc. However, ABR schemes may be reactive in nature, and may be applied only after latency, throughput, or other indicators are measured at the user endpoint(s) and notified to the server(s) or other user endpoint(s).

Examples of the present disclosure enable a network service provider/network operator (e.g., an Internet service provider (ISP)) to detect video freeze issues during video communication sessions. It should be noted that as referred to herein, an online conference may refer to any online, network-based communication with at least one video component (e.g., a video call where at least one participant share video, a two-way or multi-way video call where two or more participants share video). An online conference may also include screen sharing, slide, document, or other multimedia sharing, captioning, translation, and other ancillary services among two or more participants. In particular, examples of the present disclosure detect video freeze in near real-time when an online conference is ongoing. For instance, examples of the present disclosure may collect and process near real-time (e.g., per-second) network performance data from a customer premises equipment (CPE) that is accessible to, managed, and/or operated by a communication network. The CPE may include a gateway, a router, an access point (wired or wireless, which can include an IEEE 802.11/Wi-Fi access point, a cellular hotspot, etc.), or the like. In one example, the present disclosure may include a network-based processing system, e.g., deployed at the network edge, which may obtain the network performance data from the CPE and which may apply one or more rule sets to the network performance data set(s) (e.g., network performance indicators, or "key performance indicators" (KPIs)) for detecting instances of video freeze for video communication sessions.

To further illustrate, in one example, the present disclosure may involve multiple online conference participants connecting to one or more conference servers over the Internet. For a given participant, a CPE, such as a gateway (e.g., a residential gateway (RG), or the like) may be deployed between a Wi-Fi router and ISP infrastructure. In one example, the gateway may include a video freeze detection module (e.g., an artificial intelligence (AI) classification and enforcement application). In one example, the module/application may run as a small virtual machine (VM), container, or the like (e.g., a Docker container) instantiated on the gateway. In one example, the video freeze detection module may generate aggregated records over a time period (e.g., 10 second records), which may be uploaded to a network-based processing system (e.g., a freeze detection platform) comprising one or more servers, or the like. In one example, the records may be published to a stream processing platform (such as Apache Kafka, or the like), where the processing system may comprise a subscriber to a stream of the aggregated records from the module of the gateway. In one example, the processing system may be deployed in an edge cloud, e.g., in an access network portion of a communication network. In one example, one or more additional processing systems may also subscribe to the same stream. For instance, records may also be stored in a database for machine learning model training and/or rule learning, and so forth.

In one example, the video freeze detection platform may sort the received aggregated records by timestamp and may reproduce more detailed records therefrom (such as generating 1-second records from aggregated 10-second records). In one example, the detailed records may be further sorted by timestamp. The video freeze detection platform may then apply pre-defined rules to the detailed records (e.g., time series of KPIs, such as uplink and downlink packet rates, bit/byte rates, etc.). This processing may further be conceptualized as applying the detailed records as inputs to a rule-based model, or rule set, to obtain an output comprising an indication of whether video freeze is detected or not. In one example, the rule set may include rules which may remove false positives based upon the decision(s) of one or more other rules. For instance, when there is a sharp drop in a download packet rate (e.g., 25 percent or more), a rule may hold that this is indicative of a video freeze. However, when there is a corresponding increase in a screen sharing packet rate, this may indicate that the drop in download packet rate is a false positive, and a corresponding rule may be defined accordingly. In one example, the rule set may be generated via a rule learning algorithm from training data. For instance, as noted above, aggregated records may also be stored in a database/data storage system for such purpose. The rule learning algorithm may comprise, for example, a decision tree classifier, e.g., where the rules are associated with leaves/nodes of the decision tree, an incremental reduced error pruning (IREP) classifier, a repeated incremental pruning to produce error reduction (RIPPER) classifier, or the like. In one example, the database may also include records from endpoint devices with timestamps of occurrences of video freeze. For instance, one or more endpoint devices may be configured to gather labels of video freeze and to upload these labels to the database for correlation with the respective aggregate records from one or more gateways (e.g., by timestamp).

In one example, the video freeze detection platform may take one or more remedial actions when a video freeze is detected. For instance, the gateway may be configured with two or more network access technologies, e.g., 5G/cellular and fiber optic/wired access. In one example, when video freeze is detected, the gateway may switch the conference session from one access mode to another for an endpoint device of a participant being served by the gateway. In one example, a notification may be transmitted to the endpoint device of the participant indicating that wireless conditions between the endpoint device and the gateway (and/or access point, router, or the like) are poor and that the participant should move the endpoint device to another location, and so forth.

In various examples, one or more rule sets may be based upon the following observations. First, in many cases, "video freeze" may be the result of a drop (often sudden) of video channel bandwidth. From the perspective of a CPE of a given participant, a detection of a drop in downlink bandwidth is a "freeze" for that participant, whereas an uplink drop will be a "freeze" for other attendees/participants of an online conference. It is also noted that some online conference platforms/services may try to stabilize to a lower resolution on a lower bandwidth in response to a drop in downlink, uplink, or both. In addition, some online conference platforms may use Transmission Control Protocol (TCP) or Uniform Datagram Protocol (UDP). For instance, it is observed that one platform may use TCP for authentication and authorization, whereas UDP may be used for all other needs. In addition, designated IP ranges and port ranges may be used on the server side. For instance, at the start of an online conference, multiple sessions may be set up on all designated ports. For instance, a first port may be used in every stream "pair" for resource allocation and approval (e.g., where a pair may be uplink-downlink video, uplink-downlink audio, uplink-downlink screen sharing, or the like). A request-response exchange may take place every 20 seconds or the like on an ongoing basis. In one example, this may be used for measuring application level latency. A second port may be used for initial coordination, while a third port may be used for both audio and video streams. The differentiator for all streams may be client-side ephemeral ports.

It is also observed that a video stream may be used no matter how many participants are in the meeting. The video stream has higher PPS (packet per second) count than that of the audio stream. For instance, a video stream may generally exceed around 200 PPS, while an audio stream is relatively stable at around 50-55 PPS (approximately a packet per 20 milli-seconds). A fourth port may be used for screen sharing. In one example, it is observed that when one participant starts to share a screen, the other participants may see the video stream PPS drop. This may correspond to a video window being minimized or hidden. It should be noted that bits/bytes per second (BPS) generally mirrors PPS, but it may fluctuate more for different video resolutions. It is also observed that when a participant's endpoint device is using Wi-Fi, signal strength should be better than approximately −76 dBm. For instance, if the signal strength is −80 dBm or worse, participants in the meeting may expect to see freezes, choppy video, and lower resolution.

As noted above, in one example, a video stream may usually exhibit greater than 200 PPS (packet-per-second). When a sharp drop (25%) of PPS happens, the present disclosure may first check if screen-share traffic is up on the designated port. If screen-share traffic is up, the drop in video PPS may be ignored. If not, a possible/likely video freeze may be declared. Jitter, e.g., an unevenness of PPS, may be indicated by a dip in PPS (uplink and/or downlink) followed by a spike (e.g., due to resend). This may also indicate a video quality degradation, and a possible video freeze. Notably, the timeliness of the bandwidth negotiation packets on the designated port may take very little bandwidth, and may thus remain stable even in bad patches. Accordingly, video freeze may primarily be indicated by drop of PPS (uplink and/or downlink). Together with Wi-Fi quality (when access is via Wi-Fi) this may further indicate the likely cause. It is also noted that the degradation of link quality, whether Wi-Fi or Internet link, may typically be bi-directional.

In a multi-attendee meeting, multiple participants may have cameras on. When one or two participants turn cameras off, the other participants may see a drop in downlink PPS. Participants lowering/minimizing meeting windows may have similar effects. For instance, this may be indicated by a sudden yet smooth drop pattern, instead of a more jagged pattern in bandwidth deterioration. In one example, a participant may experience a brief "freeze" when the bandwidth becomes narrow, but it can quickly stabilize to a lower resolution. When bandwidth improves, uplink and/or downlink PPS may grow back rather slowly. In one example, the present disclosure may target a minimum tolerable PPS for video of around 200. These and other aspects of the present disclosure are described in greater detail below in connection with the examples of FIGS. 1-4.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, 4G, 5G and the like), a long term evolution (LTE) network, and the like, related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a core network of a communication service provider network. The network 102 may be in communication with one or more access networks 120 and 122, and the Internet 160. In one example, network 102 may combine core network components of a cellular network with components of a triple play service network; where triple-play services include telephone services, Internet services and video services (e.g., television services, streaming service, etc.) to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VOIP) telephony services. Network 102 may further comprise a broadcast video network, e.g., a traditional cable provider network or an Internet Protocol Television (IPTV) network, as well as an Internet Service Provider (ISP) network. In one example, network 102 may include a plurality of video servers (e.g., a broadcast server, a cable head-end), a plurality of content servers, an advertising server (AS), an interactive TV/video-on-demand (VOD) server, a streaming server, and so forth. For ease of illustration, various additional elements of network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, $3^{rd}$ party networks, and the like. For example, the operator of network 102 may provide a cable television service, a streaming service, an IPTV service, or any other types of communication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a communication network service provider. The network 102 and the access networks 120 and 122 may be operated by different service providers, the same service provider, or a combination thereof, or may be operated by entities having core businesses that are not related to telecommunications services, e.g., corporate, governmental or educational institution LANs, and the like. In one example, each of the access networks 120 and 122 may include at least one access point, such as a cellular base station, non-cellular wireless access point, a digital subscriber line access multiplexer (DSLAM), a cross-connect box, a serving area interface (SAI), a video-ready access device (VRAD), or the like, for communication with various endpoint devices. For instance, as illustrated in FIG. 1, access network(s) 120 may include at least one wireless access point 123 (e.g., a cellular base station). In addition, access network(s) 120 may also include a node 125, e.g., a mini-fiber node (MFN), a VRAD, or the like.

In one example, one or more of the access network(s) 120 may comprise an "edge cloud," which may refer to an access network that includes cloud computing infrastructure, e.g., a collection of computing resources that may be assigned to different clients and which may comprise processors, e.g., central processing units (CPUs), graphics processing units (GPUs), programmable logic devices (PLDs), such as field programmable gate arrays (FPGAs), or the like, memory, storage, and so forth. In an example where the access network(s) 120 comprise radio access networks, this infrastructure, such as server(s) 126, may be referred to as mobile edge infrastructure, and may comprise servers hosting virtualization platforms for managing one or more virtual machines (VMs), containers, microservices, or the like. In one example, server(s) 126 may be collocated with either or both of wireless access point 123 and node 125.

In one example, server(s) 126 may also comprise network function virtualization infrastructure (NFVI), e.g., for software defined network (SDN) services of an operator of the network 102 and one or more of access network(s) 120, such as virtual mobility management entities (vMMEs), virtual serving gateways (vSGWs), virtual packet data network gateways (vPDNGWs or VPGWs) or other virtual network functions (VNFs). In such an example, the service provider VNFs may be logically separated from any client services which may be allowed to be instantiated on the same mobile edge infrastructure. In another example, servers hosting client services may be collocated with, but physically separate from any servers which may comprise NFVI for service provider functions/VNFs (e.g., server(s) 126.

In one example, the access networks 120 may be in communication with various devices, or computing systems/processing systems, such as devices 114 and 115, customer premises equipment (CPE) 135, and so forth. Similarly, access networks 122 may be in communication with one or more devices or processing systems (e.g., computing systems), such as device 116, conference server(s) 170, etc. Access networks 120 and 122 may transmit and receive communications between devices 114-116, CPE 135, conference server(s) 170, node 125, server(s) 126, application server (AS) 104 and/or database (DB) 106, other components of network 102, devices reachable via the Internet in general, and so forth.

In one example, each of the devices 114-116 may comprise a mobile computing device, a cellular smart phone, a laptop, a tablet computer, a desktop computer, a wearable computing device (e.g., a smart watch, a smart pair of eyeglasses or goggles, etc.), an application server, a bank or cluster of such devices, or the like (broadly, an "endpoint device"). In accordance with the present disclosure, each of the devices 114-116 may comprise a computing system, such as computing system 400 depicted in FIG. 4, and may be configured to perform operations or functions in connection with examples of the present disclosure for performing at least one remedial action in a communication network in response to detecting at least one of: an uplink video freeze or a downlink video freeze in accordance with a decision output of at least one rule set based upon measurements of at least one of: uplink or downlink data rates at a customer premises equipment (such as illustrated and described in connection with the example method 300 of FIG. 3). For instance, devices 114-116 may include one or more applications (apps) associated with one or more video communication services (including online conference services), in accordance with the present disclosure. Alternatively, or in addition, devices 114-116 may include web browsers that may facilitate the same functionality, e.g., via client-side operations.

As illustrated in FIG. 1, access network(s) 122 may be in communication with one or more conference servers 170, which may host and may represent one or more online conference platforms/services, and so forth. For instance, server(s) 170 may receive uplink content streams from participants (e.g., comprising at least video and audio, and in some cases including screen share uploads, files, or other media), and may distribute downlink conference content to various participants in an online conference. Server(s) 170 may also maintain user accounts and perform device and/or user authentication and authorization, may provide different levels of access to different participants based on user profiles/accounts, permissions set by conference hosts/organizers, etc. It should be noted that the functions of server(s) 170 may vary among online conference platforms. For instance, in another example, an online conference platform may be configured such that video and audio streams are sent device-to-device, e.g., without uploading to server(s) 170 and redistributing to participants. In accordance with the present disclosure, each of the conference server(s) 170 may comprise a computing system or server, such as computing system 400 depicted in FIG. 4, and may individually or collectively be configured to perform operations or functions in connection with examples of the present disclosure for performing at least one remedial action in a communication network in response to detecting at least one of: an uplink video freeze or a downlink video freeze in accordance with a decision output of at least one rule set based upon measurements of at least one of: uplink or downlink data rates at a customer premises equipment.

As noted above, access network(s) 120 may be in communication with a CPE 135, which may be deployed at a customer premises 130. In one example, customer premises 130 may represent a local area network (LAN) of a residence, an office, a business, a school, or other institutions. In one example, CPE 135 may provide network/Internet access (e.g., via one or more connections to access network(s) 120) to various endpoint devices, such as device 114. In one example, CPE 135 may comprise a gateway, a router, a wired and/or wireless access point, or the like. In this present example, CPE 135 may have dual/multiple access technologies. For instance, CPE 135 may comprise a 5G hotspot which may have a wireless connection (e.g., a wireless backhaul to wireless access point 123) and a wired connection (e.g., a fiber optic connection or the like) to node 125. In one example, different access modes may be selected automatically by CPE 135 and/or may be user-selected. In one example, communications for different endpoint devices and/or communications of different types (e.g., gaming, social media, online conferencing, etc.) may be designated for different access modes via CPE 135.

Figure 3:
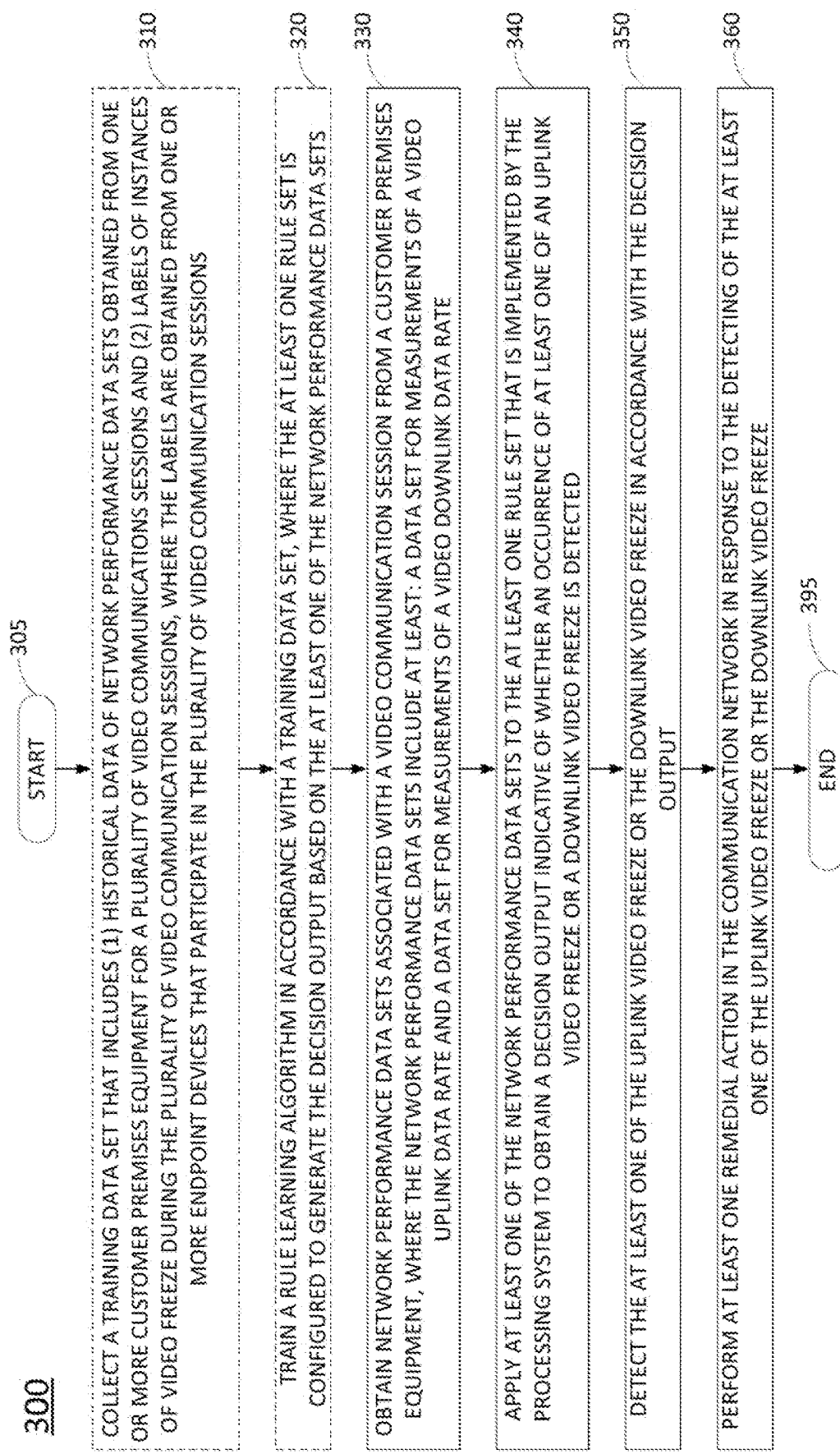
FIG. 3 illustrates a flowchart of an example method for performing at least one remedial action in a communication network in response to detecting at least one of: an uplink video freeze or a downlink video freeze in accordance with a decision output of at least one rule set based upon measurements of at least one of: uplink or downlink data rates at a customer premises equipment.
Figure 4:
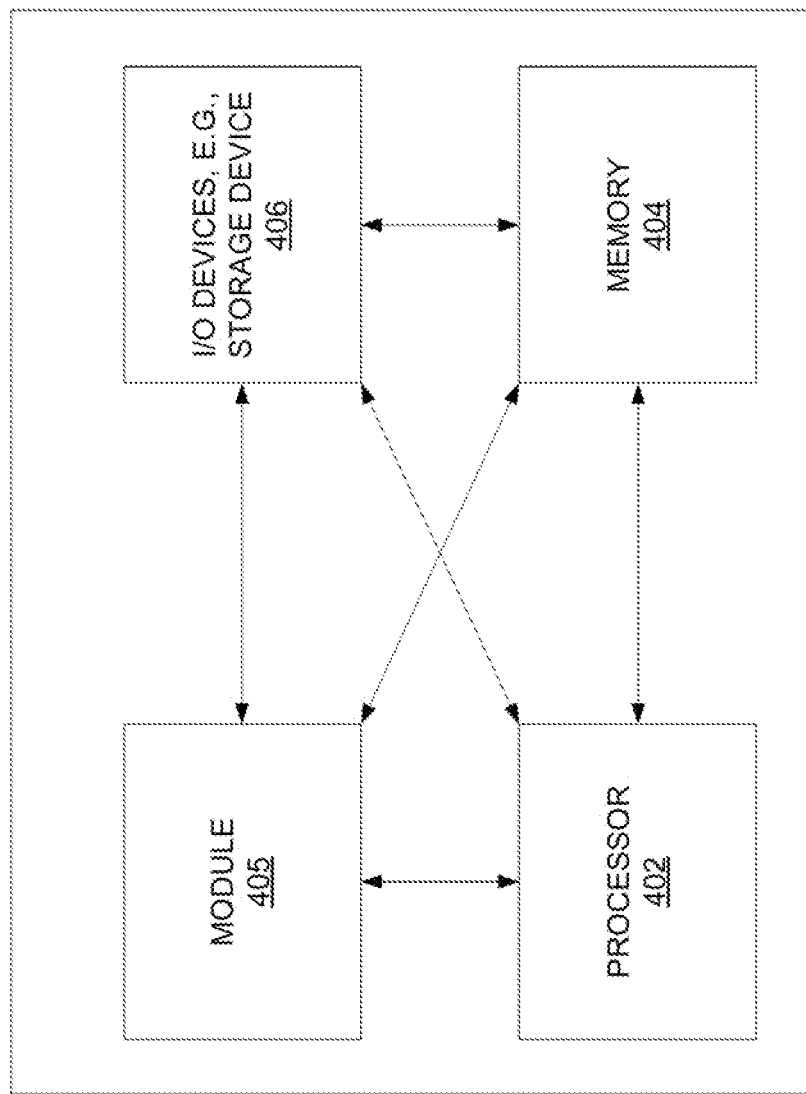
FIG. 4 illustrates a high level block diagram of a computing device specifically programmed to perform the steps, functions, blocks and/or operations described herein.

In one example, CPE 135 may comprise a computing system or server, such as computing system 400 depicted in FIG. 4, and may be configured to perform operations or functions for performing at least one remedial action in a communication network in response to detecting at least one of: an uplink video freeze or a downlink video freeze in accordance with a decision output of at least one rule set based upon measurements of at least one of: uplink or downlink data rates at a customer premises equipment, in accordance with the present disclosure. For instance, a flowchart of an example method 300 for performing at least one remedial action in a communication network in response to detecting at least one of: an uplink video freeze or a downlink video freeze in accordance with a decision output of at least one rule set based upon measurements of at least one of: uplink or downlink data rates at a customer premises equipment is illustrated in FIG. 3 and described in greater detail below. For example, CPE 135 may collect and aggregate network performance indicators (e.g., network performance data sets), and may forward/publish the aggregated records to one or more other entities, such as server(s) 104 and server(s) 126. In one example, CPE 135 may include a Linux operating system running on an ARM64 processing core.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

Access networks(s) 120 may also include server(s) 126, which may each comprise a computing system or server, such as computing system 400 depicted in FIG. 4, and may be individually or collectively be configured to perform operations or functions for performing at least one remedial action in a communication network in response to detecting at least one of: an uplink video freeze or a downlink video freeze in accordance with a decision output of at least one rule set based upon measurements of at least one of: uplink or downlink data rates at a customer premises equipment, in accordance with the present disclosure (e.g., as illustrated in FIG. 3 and described in greater detail below). For instance, server(s) 126 may comprise freeze detection platform as described herein. In one example, server(s) 126 may receive aggregated network performance records (e.g., time series of KPIs) from CPEs, e.g., including at least CPE 135. In one example, server(s) 126 may subscribe to a data feed in accordance with a stream processing platform (such as Apache Kafka, or the like). Server(s) 126 may sort aggregated records received from CPEs by timestamp, and may reproduce more detailed records therefrom (such as generating 1-second records from aggregated 10-second records). In one example, the detailed records may be further sorted by timestamp. Server(s) 126 may then apply pre-defined rules (e.g., one or more rule sets) to the detailed records (e.g., time series of KPIs, such as uplink and downlink packet rates, bit/byte rates, etc.) to detect instances of video freeze. In one example, server(s) 126 may further take one or more remedial actions when a video freeze is detected. For instance, server(s) 126 may instruct the CPE 135 to switch an online conference session from one access mode to another (such as for a conference for user 184 via device 114, e.g., where the other conference participants may include users 185 and 186 at devices 115 and 116, respectively). In one example, a notification may be transmitted to device 114 indicating that wireless conditions between the device 114 and the CPE 135 are poor and that user 184 should move device 114 to another location, and so forth.

In the example of FIG. 1, network 102 may also include one or more server(s) 104 and one or more databases (DBs) 106. In accordance with the present disclosure, server(s) 104 may each comprise a computing system or server, such as computing system 400 depicted in FIG. 4, and may individually or collectively be configured to perform operations or functions in connection with examples of the present disclosure for performing at least one remedial action in a communication network in response to detecting at least one of: an uplink video freeze or a downlink video freeze in accordance with a decision output of at least one rule set based upon measurements of at least one of: uplink or downlink data rates at a customer premises equipment (e.g., illustrated in FIG. 3 and described in greater detail below). In one example, DB(s) 106 may comprise one or more physical storage devices (e.g., a database server) integrated with, attached, or coupled to the server(s) 104, or remotely accessible to server(s) 104 to store various types of information in accordance with the present disclosure. For example, DB(s) 106 may store aggregated records from one or more customer premises equipment, such as CPE 135. For instance, as noted above, the records may be published to a stream processing platform, e.g., as one or more "feeds." As such, server(s) 104 and/or DB(s) 106 may subscribe to the one or more feeds. In one example, server(s) 104 and DB(s) 106 may comprise a data feature store and/or artificial intelligence (AI)/machine learning model (MLM) development platform (e.g., a network-based and/or cloud-based service hosted on the hardware of server(s) 104 and/or DB(s) 106). For instance, AS 104 may train one or more machine learning model (MLMs) that is/are configured to detect online conference video freeze. In one example, different MLMs may be trained to detect uplink and downlink video freeze separately.

It should be noted that as referred to herein, a machine learning model (MLM) (or machine learning-based model) may comprise a machine learning algorithm (MLA) that has been "trained" or configured in accordance with input training data to perform a particular service. For instance, an MLM may comprise a deep learning neural network, or deep neural network (DNN), a convolutional neural network (CNN), a generative adversarial network (GAN), a decision tree algorithm/model, such as gradient boosted decision tree (GBDT) (e.g., XGBoost, XGBR, or the like), a support vector machine (SVM), e.g., a non-binary, or multi-class classifier, a linear or non-linear classifier, k-means clustering and/or k-nearest neighbor (KNN) predictive models, and so forth. In one example, the MLA may incorporate an exponential smoothing algorithm (such as double exponential smoothing, triple exponential smoothing, e.g., Holt-Winters smoothing, and so forth), supervised learning and/or reinforcement learning (e.g., using positive and negative examples after deployment as a MLM), and so forth. In one example, MLAs/MLMs of the present disclosure may be in accordance with an open source library, such as OpenCV, which may be further enhanced with domain specific training data.

In one example, server(s) 104 may train a rule learner MLM/MLA, or rule learning algorithm, such as a decision tree, an incremental reduced error pruning classifier, or a repeated incremental pruning to produce error reduction (RIPPER) classifier. For instance, server(s) 104 may use records stored in DB(s) 106 as training data to train at least one rule learning algorithm, and hence to generate at least one rule set for detecting video freeze. As noted above, in one example, separate classifiers may be trained for uplink and downlink video freeze, and thus may result in two rule sets. In one example, the training data may include network performance data sets comprising uplink and downlink packet rates, bit/byte rates, etc. In one example, one or more endpoint devices, such as any one or more of devices 114-116 may be configured to gather labels of video freeze and to upload these labels to DB(s) 106 for correlation with the respective aggregate records from one or more CPEs (e.g., by timestamp). For instance, users 184-186 may volunteer to gather and provide such labels for use in classifier training/rule learning. Alternatively, or in addition, any one or more of devices 114-116 may comprise test equipment that is specifically deployed for and configured to gather such labels from online conferences in testing scenarios.

In one example, the classifier(s) may be binary, e.g., for detecting video freeze/no video freeze. In another example, the classifier(s) may be multi-class/multi-output. For instance, in one example, a classifier of the present disclosure may have outputs that may include, no video freeze, video freeze—local wireless condition, video freeze—local access condition (e.g., non-wireless), video freeze—non-local condition, and so forth. In one example in which a single classifier is trained for detecting both uplink and downlink video freeze, the possible outputs may also distinguish between uplink and downlink. In this regard, it should also be noted that both uplink and downlink video freeze may be detected at the same time/in connection with the same input(s). For instance, for each possible output category, the classifier may output a score/value, where the scores/values for uplink and downlink video freeze may both exceed a threshold indicative of video freeze detection (e.g., greater than 50 percent, greater than 75 percent, etc.). In one example, the classifier(s) may be further trained using other network performance data sets from CPE 135 and/or from other network components, such as wireless signal strength, throughput from node 125 to network 102 and/or from wireless access point 123 to network 102, and so forth. In one example, the output range of a multi-class classifier may distinguish between (1) an external link between conference server(s) 170 and CPE 135 having deteriorated condition(s), (2) a Wi-Fi or another link with the customer premises 130 (e.g., for device 114) becoming worse, which may cause CPE 135 to drop video packets in UDP, for instance, (3) a presenter/remote participant having a bad uplink (or a server problem at conference server(s) 170 causing a reduced throughput) which may cause video freeze at device 114, and so forth.

In one example, server(s) 104 and/or DB(s) 106 may comprise cloud-based and/or distributed data storage and/or processing systems comprising one or more servers at a same location or at different locations. For instance, DB(s) 106, or DB(s) 106 in conjunction with server(s) 104, may represent a distributed file system, e.g., a Hadoop® Distributed File System (HDFS™), or the like. In one example, server(s) 104, DB(s) 106, CPE 135, server(s) 126, conference server(s) 170, devices 114-116, and so forth, may operate in a distributed and/or coordinated manner to perform various steps, functions, and/or operations described herein. In one example, steps, functions, operations, or other aspects of server(s) 126 may alternatively or additionally be performed by server(s) 104, and vice versa. Similarly, steps, functions, operations, or other aspects of server(s) 126 may alternatively or additionally be performed by CPE 135. For instance, CPE 135 may implement one or more rule sets for detecting video freeze (e.g., without uploading network performance data to server(s) 126). Additional steps, functions, operations, or other aspects of CPE 135, server(s) 126, server(s) 104, DB(s) 106, or other components of system 100 are also described in greater detail below in connection with the examples of FIGS. 2 and 3.

It should also be noted that the system 100 has been simplified. Thus, the system 100 may be implemented in a different form than that which is illustrated in FIG. 1, or may be expanded by including additional endpoint devices, CPEs, access networks, network elements, servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102 and/or access networks 120 and 122 may comprise a content distribution network (CDN) having ingest servers, edge servers, and the like, for packet-based streaming of videos, music or other audio, or other content in accordance with the present disclosure. Similarly, although only two access networks 120 and 122 are shown, in other examples, access networks 120 and/or 122 may each comprise a plurality of different access networks that may interface with network 102 independently or in a chained manner. For example, device 116 and conference server(s) 170 may be in communication with network 102 via different access networks, and so forth. Thus, these and other modifications are all contemplated within the scope of the present disclosure.

Figure 2:
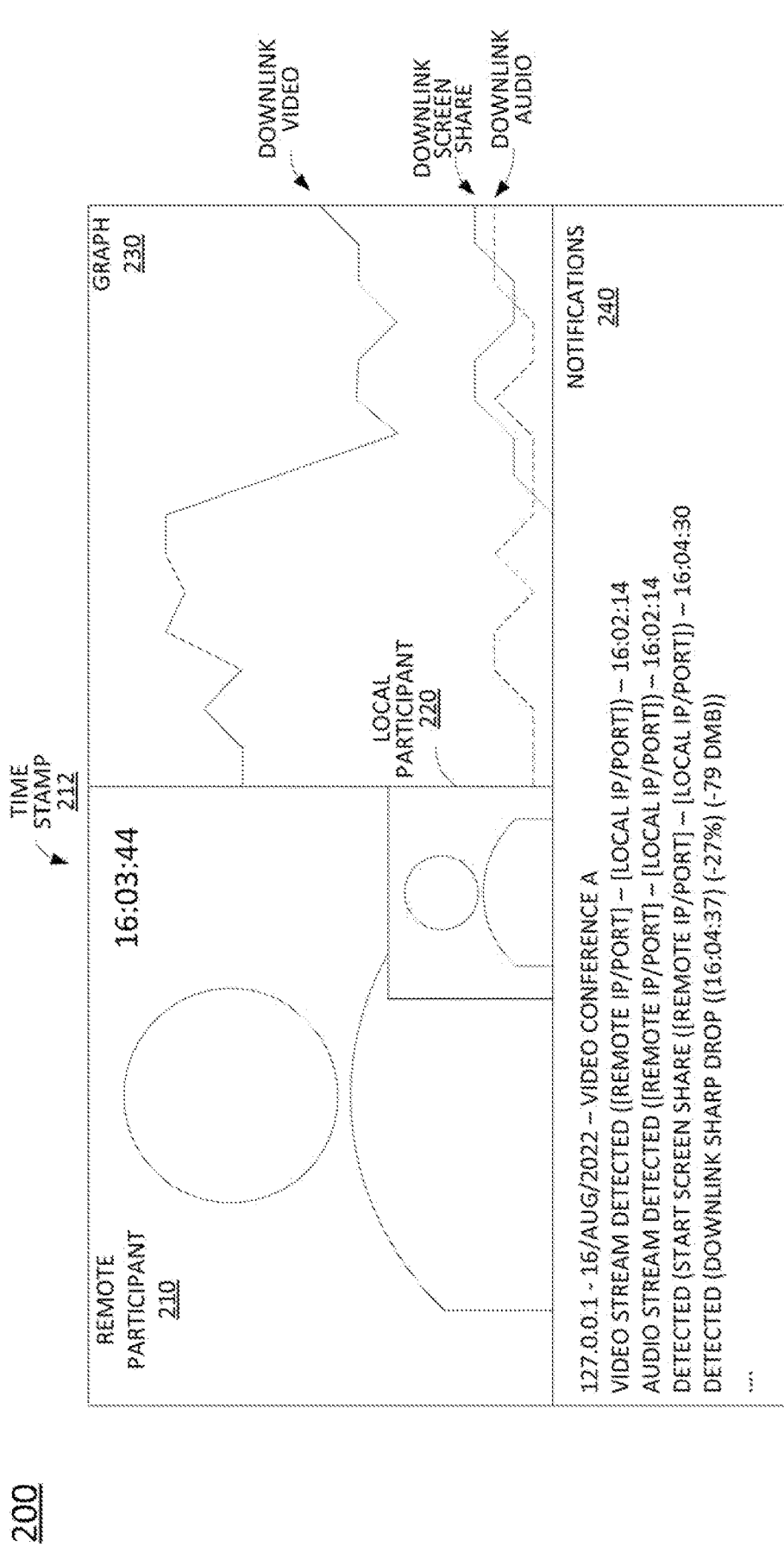
FIG. 2 illustrates an example testing interface, according to the present disclosure.

FIG. 2 illustrates an example of a testing interface 200, in accordance with the present disclosure. As illustrated in FIG. 2, the interface 200 may include a screen section for a remote participant 210, and a smaller window/screen section for a local participant 220. For testing purposes, the video of the remote participant may be visually time stamped (e.g., exemplified by time stamp 212 indicating a particular instance in time of a video communication session). The interface 200 further includes a window for graph 230. In the present example, the graph 230 illustrates network performance data sets for downlink video, downlink audio, and downlink screen share. It should be understood that in other, further, and different examples, alternative or additional plots for uplink video, audio, and/or screen share may be included in graph 230. The example interface 200 further includes a notification area 240. For instance, in the present example, the notification area provides an indication of the start of an online conference, the detection of video and audio streams, the start of a screen share, and the detection of a "sharp downlink drop" e.g., according to one or more rules of a rule set for detecting video freeze, as described herein. In the present example, the detection of a sharp drop may be indicative of video freeze in accordance with such rule(s). The notification area 240 may include the time of detection and the magnitude of the drop (e.g., from a peak/average over the last 5 seconds, or the like). In the present example, additional information is also provided, e.g., a wireless signal strength (−79 dBm).

In one example, the interface 200 may be presented via an endpoint device of the local participant 220 which may access a CPE that generates records/network performance data sets presented via the graph 230. In one example, one or more rule sets may be applied via the CPE and/or a network-based detection system of the present disclosure, with detected events presented in the notification area 240 being transmitted to the endpoint device of the local participant. Alternatively, or in addition, in a testing scenario, the endpoint device of the local participant 220 may obtain the network performance data sets (e.g., via WebSocket or the like), apply the one or more rule sets, and detect events locally at the endpoint device. It should be noted that in other, further, and different examples, various alternative or additional events may be detected and presented in the notification area 240 and/or other information, such as maximum and minimum uplink or downlink packet/data rates for video, audio, and/or screen share, maximum and/or minimum wireless signal strength detected during the online conference, and so forth. Various other information in accordance with the present disclosure may similarly be presented in notification area 240.

FIG. 3 illustrates a flowchart of an example method 300 for performing at least one remedial action in a communication network in response to detecting at least one of: an uplink video freeze or a downlink video freeze in accordance with a decision output of at least one rule set based upon measurements of at least one of: uplink or downlink data rates at a customer premises equipment, in accordance with the present disclosure. In one example, the method 300 is performed by a component of the system 100 of FIG. 1, such as by server(s) 126, CPE 135, server(s) 104, and/or any one or more components thereof (e.g., a processor, or processors, performing operations stored in and loaded from a memory), by server(s) 126, CPE 135, or server(s) 104 in conjunction with one or more other entities, such as a different one of server(s) 126, CPE 135, or server(s) 104, DB 106, devices 114-116, and so forth. In one example, the steps, functions, or operations of method 300 may be performed by a computing device or system 400, and/or a processing system 402 as described in connection with FIG. 4 below. For instance, the computing device 400 may represent at least a portion of a platform, a server, a system, and so forth that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 400 may collectively function as a processing system. For illustrative purposes, the method 300 is described in greater detail below in connection with an example performed by a processing system. The method 300 begins in step 305 and may proceed to optional step 310, optional step 320, or to step 330.

At optional step 310, the processing system may collect a training data set comprising: (1) historical data of network performance data sets obtained from one or more customer premises equipment (CPEs) for a plurality of video communications sessions and (2) labels of instances of video freeze during the plurality of video communication sessions, where the labels are obtained from one or more endpoint devices that participate in the plurality of video communication sessions. The network performance data sets may include measurements of video uplink data rates and video downlink data rates for the video communication sessions via the one or more CPEs. In one example, the network performance data sets may include measurements of screen sharing uplink data rates and/or screen sharing downlink data rates for the various video communication sessions via the one or more CPEs. In one example, the network performance data sets may additionally include measurements of wireless signals strength for the various video communication sessions via the one or more CPEs (or via wireless routers, access points, or the like, which may be in the same customer premises/local network as the respective CPE(s), if not part of the (CPEs)). In one example, the labels may be obtained from endpoint devices of users having volunteered to gather and provide such labels for use in classifier training/rule learning. Alternatively, or in addition, endpoint devices comprising test equipment may be specifically deployed for and configured to gather such labels from video communication sessions (e.g., online conferences, etc.) in testing scenarios.

At optional step 320, the processing system may train a rule learning algorithm in accordance with the training data set to generate at least one rule set. For instance, the at least one rule set may comprise a first rule set for uplink video freeze detection and a second rule set for downlink video freeze detection, or a single rule set for both uplink and downlink video freeze detection. It should also be noted that the at least one rule set can be different for different video communication services (e.g., different online conference services, video call services, etc.). In one example, the rule learning algorithm may comprise a classifier, e.g., a machine learning model (MLM), such as a decision tree, an IREP classifier, a RIPPER classifier, or the like. In one example, one or more rules of the at least one rule set may alternatively or additionally be specified by personnel of the communication network. In one example, the at least one rule set may comprise at least a first rule associated with a drop of at least one of the video uplink data rate or the video downlink data rate of at least 25 percent from a prior rate over an interval of 0.5 to 5 seconds, where the drop may be indicative of at least one of: the uplink video freeze or the downlink video freeze. The prior rate may be a previous high rate or average rate over a prior time window, e.g., the preceding five seconds, or the like.

In one example, at least a second rule may indicate to ignore the drop of the at least one of: the video uplink data rate or the video downlink data rate of at least 25 percent when a screen sharing uplink data rate or a screen sharing downlink data rate indicates that a screen sharing is active in a same direction as the drop, wherein the same direction is one of: an uplink direction or a downlink direction. For instance, this may indicate that video requirements have fallen dramatically such that a video portion of an online conference is not conveyed or is minimized. In one example, at least one of the screen sharing uplink data rate or the screen sharing downlink data rate is indicated by packets on a specified port or set of ports. It should also be noted that the video uplink data rate and the video downlink data rate may be indicated by a specified port or set of ports (e.g., a range, or other selection of ports). In one example, the at least one rule set may comprise at least a second rule that indicates that the at least one of: the video uplink data rate or the video downlink data rate being below a first threshold and above a second threshold is further indicative of at least one of: the uplink video freeze or the downlink video freeze. For instance, the first threshold may be 180 packets per second or thereabouts (e.g., 160 packets per second-200 packets per second) and the second threshold may be 10 packets per second or thereabouts (e.g., 5 packets per second-20 packets per second).

In one example, the at least one rule set may comprise at least a second rule that indicates that wireless signal strength being below a threshold is further indicative of at least one of: the uplink video freeze or the downlink video freeze (e.g., below 76 dBm 80 dBm or a significant drop in wireless signal strength (e.g., commensurate with the drop in the video uplink and/or video downlink data rate(s))). Still another rule may be associated with a unidirectional drop, e.g., a drop in downlink packet rate, but not in uplink may be indicative that problem is not the participant's wireless signal, but is in the network or a problem for another participant. In one example, this may be built into the rule set(s). For example, the rule set(s) may be generated in accordance with a multi-output classifier. In such case, an associated remedial action may not include changing a wireless access channel (e.g., since the cause of the video freeze would not appear to be in such a part of a subject video communication session). It should again be noted that in one example, the at least one rule set may alternatively or additionally comprise one or more user-defined rules.

At step 330, the processing system obtains network performance data sets associated with a video communication session from a customer premises equipment (CPE). The network performance data sets may include at least: a data set for measurements of a video uplink data rate and a data set for measurements of a video downlink data rate (e.g., via the CPE or another component at a customer premises associated with the CPE) for the video communication session. It should be noted that the video uplink data rate and the video downlink data rate may be measured in packets per unit time (e.g., packets per second, or the like), and/or bits/bytes per unit time, etc. In one example, the network performance data sets may include a data set for a screen sharing uplink data rate and/or a data set for a screen sharing downlink data rate for the video communication session. In one example, the network performance data sets may additionally include a data set for measurements of wireless signals strength for the video communication session. In one example, the video communication session may comprise an online conference, e.g., a video conference. In one example, the video conference may include three or more participants.

At step 340, the processing system applies at least one of the network performance data sets to at least one rule set that is implemented by the processing system to obtain a decision output indicative of whether an occurrence of at least one of: an uplink video freeze or a downlink video freeze is detected, where the at least one rule set is configured to generate the decision output based on the at least one of the network performance data sets. The at least one rule set may include any of the example rules such as described above in connection with optional step 320. In addition, in one example, the at least one rule set may be generated via training of a rule learning algorithm, such as described above in connection with optional step 320.

At step 350, the processing system detects the at least one of: the uplink video freeze or the downlink video freeze in accordance with the decision output. For instance, the at least one rule set may have a binary output (e.g., video freeze/no video freeze). In the case of separate rule sets for uplink and downlink, a first rule set for the uplink may have a binary output which may be one of (uplink video freeze/no uplink video freeze) and similarly for the downlink the binary output may be one of (downlink video freeze/no downlink video freeze). In still another example, decision outputs may be from a range of: no video freeze, video freeze-local wireless condition, video freeze-local access condition (e.g., non-wireless), video freeze-non-local condition, and so forth. It should be noted that the foregoing are just several examples of output ranges for a rule set, e.g., in accordance with a multi-class classifier.

At step 360, the processing system performs at least one remedial action in the communication network in response to the detecting of the at least one of: the uplink video freeze or the downlink video freeze. In one example, the at least one remedial action may comprise switching the video communication session from a first access channel to a second access channel of a plurality of available access channels. For instance, the CPE and/or another component of a customer premises associated with the CPE may provide both a cellular access channel and a fiber-optic access channel. In one example, the CPE may comprise a 5G small cell, 5G hotspot, personal hotspot, or the like. For example, such component may be configured for integrated access and backhaul (IAB). In addition, the CPE or another component may be configured as a gateway to an optical access network. The switching of access channels can be implemented when the cause of the video freeze is further detected to be associated with poor access channel conditions (e.g., poor wireless coverage/signal strength, throughput, etc. or poor throughput via an optical access channel, for instance).

In one example, the at least one remedial action may comprise transmitting a notification to an endpoint device of a participant of the video communication session that is associated with the CPE. For instance, when the cause is further detected, via the at least one rule-set, to be poor wireless coverage/signal strength, the notification can inform the participant that the video freeze is detected to be associated with such condition and that the user is recommended to move (e.g., closer to the gateway, router, access point, or the like). It should also be noted that in various examples, the processing system may be deployed in the CPE, in an edge cloud of a communication network, or in another network-based location such as in a core network of the communication network, in a public or private cloud (e.g., in one or more data centers), or the like. Thus, in some example, the operations of step 360 may be implemented by the processing system itself, or by the processing system transmitting a request and/or instruction(s) to one or more other entities.

Following step 360, the method 300 proceeds to step 395 wherein the method 300 ends.

It should be noted that the method 300 may be expanded to include additional steps, or may be modified to replace steps with different steps, to combine steps, to omit steps, to perform steps in a different order, and so forth. For instance, in one example the processing system may continue to repeat one or more steps of the method 300, such as repeating steps 330-340 until a video freeze is detected, steps 330-350 for multiple instances of video freeze, e.g., in a same video communication session, and so forth. In one example, step 360 may be performed after a threshold number of instances of uplink and/or downlink video freeze detection. For instance, the method 300 may refrain from implementing a remedial action for one or only a few isolated instances of video freeze, but may proceed to step 360 when more prevalent, e.g., more than 5 instances in a 10 second window, more than 5 instances over 20 seconds, etc. In one example, a rule associated with a unidirectional drop (e.g., a drop in downlink packet rate, but not in uplink, or vice versa) may be an additional rule that is applied after a video freeze is determined via other rules. For instance, video freeze may be detected via steps 330-350, while the remedial action may be selected in accordance with one or more additional rules at step 360. In one example, the present disclosure may implement one or more remedial actions differently for participants using different endpoint devices. For instance, it may be the case that a participant on a mobile phone may tolerate worse video quality than a user on a laptop or desktop computer. In one example, different rule sets may be generated for endpoint devices of different types and/or using different access modalities (e.g., Wi-Fi versus Ethernet or the like, 5G versus optical access, and so forth). In one example, the method 300 may be expanded or modified to include steps, functions, and/or operations, or other features described above in connection with the example(s) of FIG. 1 and/or FIG. 2, or as described elsewhere herein. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method(s) can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 4 depicts a high-level block diagram of a computing device or processing system specifically programmed to perform the functions described herein. For example, any one or more components or devices illustrated in FIG. 1 and/or FIG. 2, or described in connection with the example (s) of FIG. 3 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for performing at least one remedial action in a communication network in response to detecting at least one of: an uplink video freeze or a downlink video freeze in accordance with a decision output of at least one rule set based upon measurements of at least one of: uplink or downlink data rates at a customer premises equipment, and various input/output devices 406, e.g., one or more sensors, a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for performing at least one remedial action in a communication network in response to detecting at least one of: an uplink video freeze or a downlink video freeze in accordance with a decision output of at least one rule set based upon measurements of at least one of: uplink or downlink data rates at a customer premises equipment (e.g., a software program comprising computer-executable instructions) can be loaded into memory 404 and executed by hardware processor element 402 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for performing at least one remedial action in a communication network in response to detecting at least one of: an uplink video freeze or a downlink video freeze in accordance with a decision output of at least one rule set based upon measurements of at least one of: uplink or downlink data rates at a customer premises equipment (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
    training, by a processing system including at least one processor, a rule learning algorithm in accordance with a training data set, wherein the training data set comprises historical network performance data sets obtained from one or more customer premises equipment for a plurality of video communication sessions and labels of instances of video freeze during the plurality of video communication sessions, and wherein the labels are obtained from one or more endpoint devices that participate in the plurality of video communication sessions;
    obtaining, by the processing system, network performance data sets associated with a video communication session from a customer premises equipment, wherein the network performance data sets include at least: a data set for measurements of a video uplink data rate and a data set for measurements of a video downlink data rate;
    applying, by the processing system, at least one of the network performance data sets to at least one rule set that is implemented by the processing system to obtain a decision output indicative of whether an occurrence of at least one of: an uplink video freeze or a downlink video freeze is detected, wherein the at least one rule set is configured to generate the decision output based on the at least one of the network performance data sets, and wherein the at least one rule set is generated via the rule learning algorithm;

detecting, by the processing system, the at least one of: the uplink video freeze or the downlink video freeze in accordance with the decision output; and performing, by the processing system, at least one remedial action in response to the detecting of the at least one of: the uplink video freeze or the downlink video freeze.

2. The method of claim 1, wherein the processing system is deployed in the customer premises equipment or in an edge cloud of a communication network.

3. The method of claim 1, wherein the at least one remedial action comprises:

switching the video communication session from a first access channel to a second access channel of a plurality of available access channels.

4. The method of claim 3, wherein the plurality of available access channels comprises: a cellular access channel and a fiber-optic access channel.

5. The method of claim 1, wherein the at least one remedial action comprises:

transmitting a notification to an endpoint device of a participant of the video communication session that is associated with the customer premises equipment.

6. The method of claim 1, wherein the video uplink data rate and the video downlink data rate are measured in packets per unit time.

7. The method of claim 1, wherein the at least one rule set comprises at least a first rule associated with a drop of at least one of the video uplink data rate or the video downlink data rate of at least 25 percent from a prior rate over an interval of 0.5 to 5 seconds, and wherein the drop is indicative of at least one of: the uplink video freeze or the downlink video freeze.

8. The method of claim 7, wherein the network performance data sets further include at least one of: a data set for measurements of a screen sharing uplink data rate or a data set for measurements of a screen sharing downlink data rate, wherein the at least one rule set comprises at least a second rule that indicates to ignore the drop of the at least one of: the video uplink data rate or the video downlink data rate of at least 25 percent when the screen sharing uplink data rate or the screen sharing downlink data rate indicates that a screen sharing is active in a same direction as the drop, and wherein the same direction is one of: an uplink direction or a downlink direction.

9. The method of claim 8, wherein at least one of: the screen sharing uplink data rate or the screen sharing downlink data rate is indicated by packets on a specified port or a set of ports.

10. The method of claim 7, wherein the at least one rule set comprises at least a second rule that indicates that when the at least one of: the video uplink data rate or the video downlink data rate is below 10 packets per second, to ignore the drop of the at least one of: the video uplink data rate or the video downlink data rate of at least 25 percent.

11. The method of claim 7, wherein the at least one rule set comprises at least a second rule that indicates that the at least one of: the video uplink data rate or the video downlink data rate being below a first threshold and above a second threshold is further indicative of at least one of: the uplink video freeze or the downlink video freeze.

12. The method of claim 7, wherein the network performance data sets further include a data set for measurements of a wireless signal strength, and wherein the at least one rule set comprises at least a second rule that indicates that the wireless signal strength being below a threshold is further indicative of at least one of: the uplink video freeze or the downlink video freeze.

13. The method of claim 1, wherein the video communication session comprises a video conference.

14. The method of claim 13, wherein the video conference includes three or more participants.

15. The method of claim 1, wherein the rule learning algorithm comprises:

a decision tree classifier;

an incremental reduced error pruning classifier; or a repeated incremental pruning to produce error reduction classifier.

16. The method of claim 1, wherein the at least one rule set comprises: a first rule set for uplink video freeze detection and a second rule set for downlink video freeze detection.

17. A non-transitory computer-readable medium storing instructions which, when executed by a processing system including at least one processor, cause the processing system to perform operations, the operations comprising:

training a rule learning algorithm in accordance with a training data set, wherein the training data set comprises historical network performance data sets obtained from one or more customer premises equipment for a plurality of video communication sessions and labels of instances of video freeze during the plurality of video communication sessions, and wherein the labels are obtained from one or more endpoint devices that participate in the plurality of video communication sessions;

obtaining network performance data sets associated with a video communication session from a customer premises equipment, wherein the network performance data sets include at least: a data set for measurements of a video uplink data rate and a data set for measurements of a video downlink data rate;

applying at least one of the network performance data sets to at least one rule set that is implemented by the processing system to obtain a decision output indicative of whether an occurrence of at least one of: an uplink video freeze or a downlink video freeze is detected, wherein the at least one rule set is configured to generate the decision output based on the at least one of the network performance data sets, and wherein the at least one rule set is generated via the rule learning algorithm;

detecting the at least one of: the uplink video freeze or the downlink video freeze in accordance with the decision output; and performing at least one remedial action in response to the detecting of the at least one of: the uplink video freeze or the downlink video freeze.

18. An apparatus comprising:

a processing system including at least one processor; and a non-transitory computer-readable medium storing instructions which, when executed by the processing system, cause the processing system to perform operations, the operations comprising:

training a rule learning algorithm in accordance with a training data set, wherein the training data set comprises historical network performance data sets obtained from one or more customer premises equipment for a plurality of video communication sessions and labels of instances of video freeze during the plurality of video communication sessions, and wherein the labels are obtained from one or more endpoint devices that participate in the plurality of video communication sessions;

obtaining network performance data sets associated with a video communication session from a customer premises equipment, wherein the network performance data sets include at least: a data set for measurements of a video uplink data rate and a data set for measurements of a video downlink data rate;

applying at least one of the network performance data sets to at least one rule set that is implemented by the processing system to obtain a decision output indicative of whether an occurrence of at least one of: an uplink video freeze or a downlink video freeze is detected, wherein the at least one rule set is configured to generate the decision output based on the at least one of the network performance data sets, and wherein the at least one rule set is generated via the rule learning algorithm;

detecting the at least one of: the uplink video freeze or the downlink video freeze in accordance with the decision output; and performing at least one remedial action in response to the detecting of the at least one of: the uplink video freeze or the downlink video freeze.

19. The apparatus of claim 18, wherein the apparatus comprises:

a customer premises equipment; or a component of an edge cloud of a communication network.

20. The apparatus of claim 18, wherein the at least one remedial action comprises:

switching the video communication session from a first access channel to a second access channel of a plurality of available access channels.

\* \* \* \* \*